June 19, 1956  P. C. SEALS  2,750,706
FISHING TACKLE BOX

Filed June 16, 1954  2 Sheets-Sheet 1

Paul C. Seals
INVENTOR.

BY Clarence A. O'Brien
and Harvey B. Jackson
Attorneys

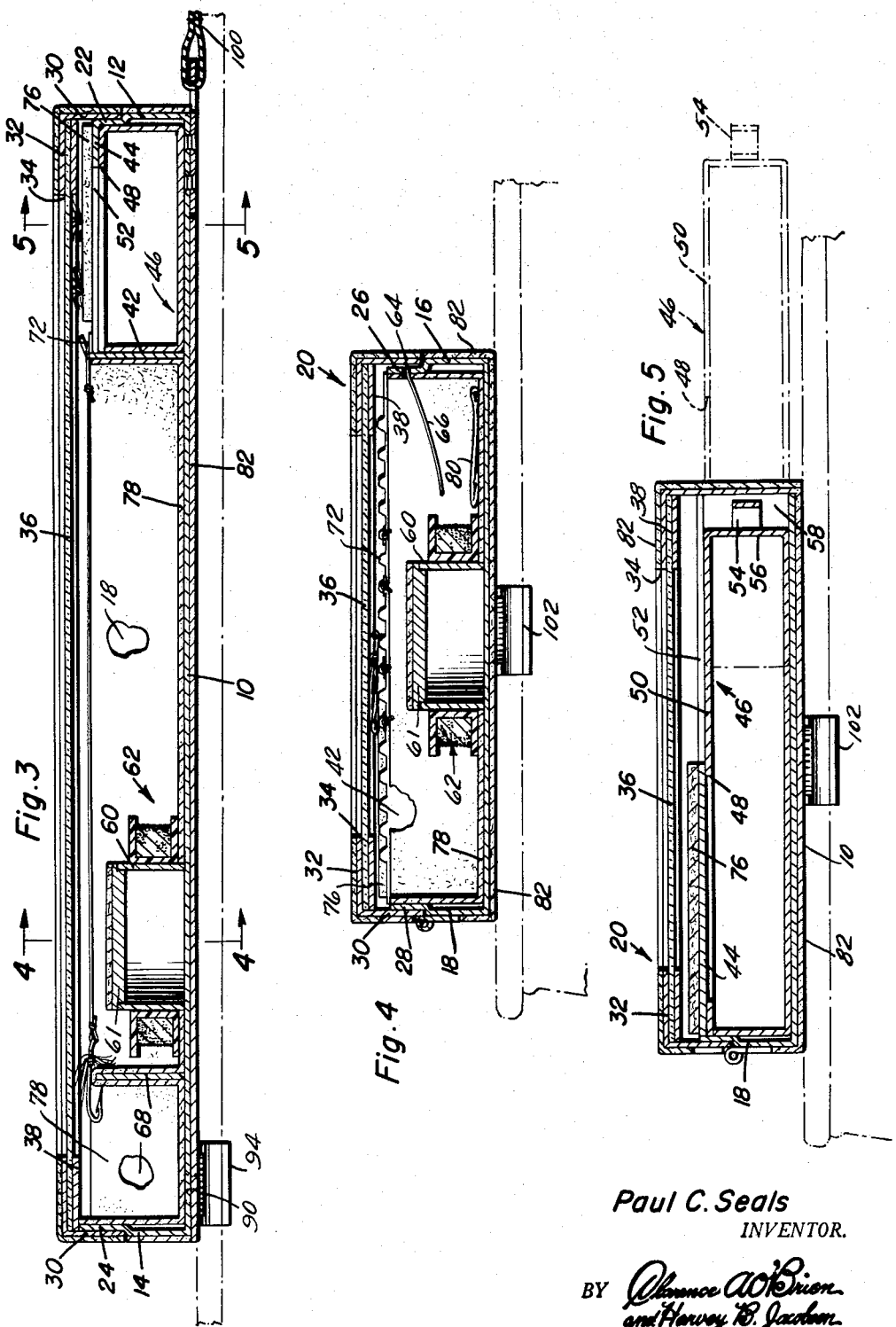

United States Patent Office 2,750,706
Patented June 19, 1956

2,750,706

FISHING TACKLE BOX

Paul C. Seals, Grand Junction, Colo.

Application June 16, 1954, Serial No. 437,050

3 Claims. (Cl. 43—57.5)

This invention relates to fisherman's accessories and relates more particularly to improvements in fishing tackle boxes.

A primary object of this invention is to provide an improved fishing tackle box which is of simple yet practical construction and which incorporates in a minimum amount of space, a maximum of accessory and bait carrying means which will enable a fisherman to carry all the necessary accessories to practice the art of fishing.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is an enlarged longitudinal section taken through the tackle box;

Figure 4 is a transverse sectional view taken substantially along the plane of section line 4—4 of Figure 3; and Figure 5 is a transverse sectional view taken substantially along the plane of section line 5—5 of Figure 3.

Figure 1:
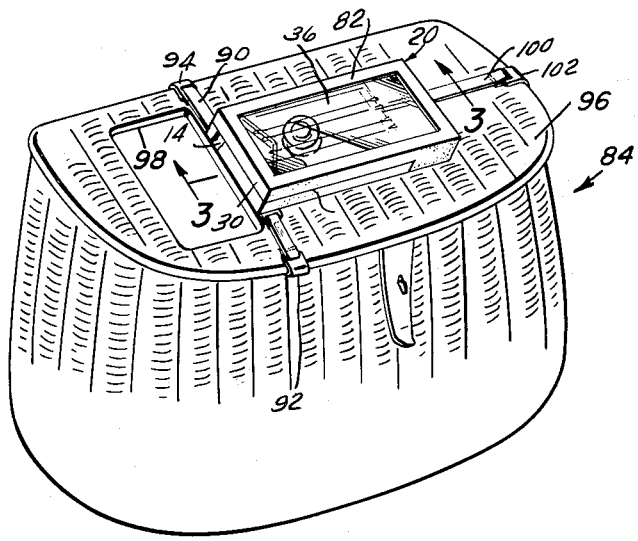
Figure 1 is a perspective view of a creel showing the tackle box mounted thereon.

Referring now more particularly to the drawings, the fishing tackle box will be seen to be of elongated rectangular configuration as formed by the bottom wall 10, the spaced side walls 12 and 14, the front wall 16, the rear wall 18 and the cover member which is indicated generally by the reference character 20.

The side walls and the front and rear walls are provided with laterally offset upper edge portions 22, 24, 26 and 28 such as to be frictionally engaged and embraced by the peripheral depending flange 30 extending around the cover member 20. This flange depends from the top plate portion 32 of the cover member which is preferably provided with a rectangular opening 34 therein so as to allow visual access to the interior of the fishing tackle box when the cover member is closed. To protect the contents of the box, a sheet of transparent material 36, such as plastic or the like underlies the opening 34 and a rectangular open frame 38 is secured to the cover member to maintain the sheet 36 in place.

Figure 2:
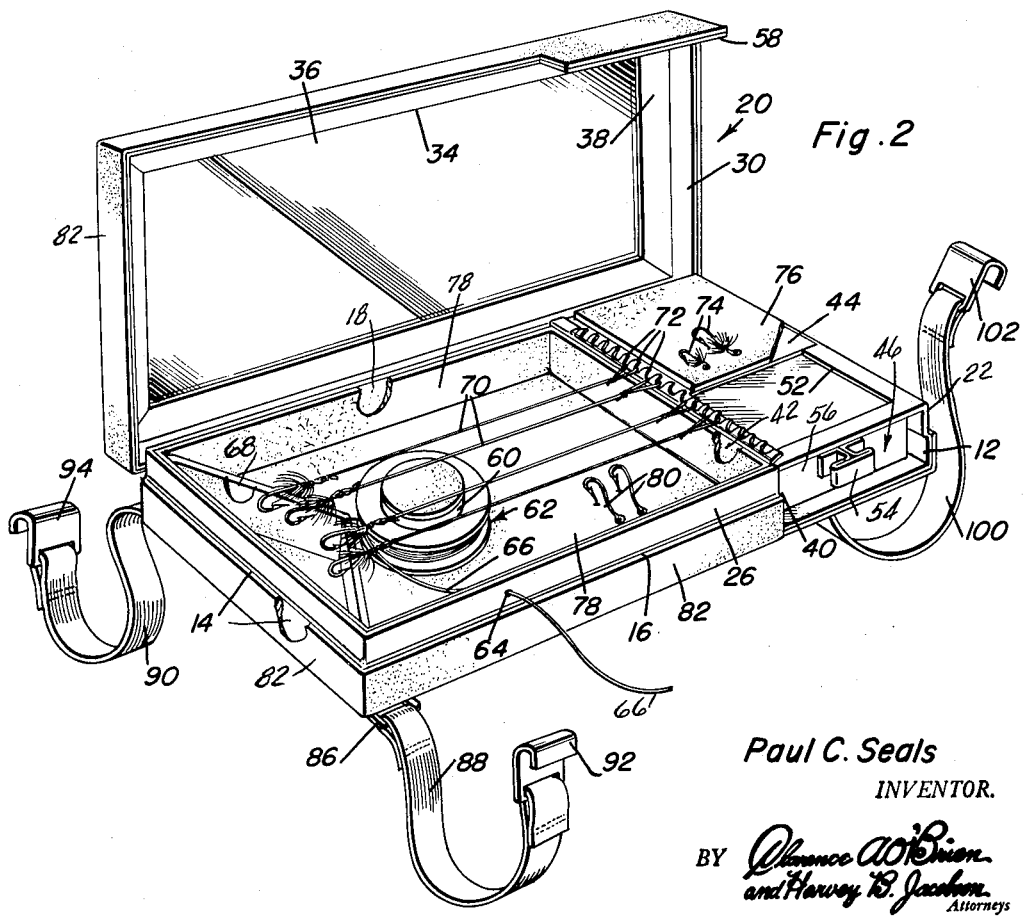
Figure 2 is an enlarged perspective view of the tackle box in open position.

The front wall 16 is secured at one end thereof to the side wall member 14 and extends therefrom toward the other side wall member 12 but terminates in spaced relation to the latter and thus defines and provides a drawer clearance opening 40 as shown in Figure 2. At this point, a partition wall 42 is secured within the box and extends between the terminus of the front wall and a point on the rear wall 18 in parallelism with the side walls 12 and 14. A top plate member 44 is secured and located between the upper offset portion or flange 22 of the side wall 12 and the partition wall 42 and overlies the bottom wall 10 in spaced parallel relation so as to provide a recess or compartment in the box for reception of the drawer 46. The drawer is in itself of box-like construction and is completely closed with the exception of the rectangular opening 48 in its top 50 which will register, when the drawer is partially withdrawn from the recess, with an opening 52 in the top plate 44. This drawer is utilized as a bait box for maintaining live bait therein such as flies, grasshoppers or the like or may be even utilized as a receptacle for small fish such as minnows in which case a small amount of water may be maintained in the drawer. When the drawer is closed in Fig. 5, as shown in full lines, the imperforate compartment wall 44 overlies and closes the opening 48.

The drawer or bait box 46 is provided with a projecting handle 54 on its front wall 56 and it is to be noted that the box is shorter than the over-all width of the tackle box such that the handle 54 does not project outwardly of the tackle box when the drawer is in the inner or retracted position.

For the purpose of sealing off the drawer opening 40 and preventing accidental removal of the drawer or bait box 46, the flange 30 of the cover member is provided with a depending extension or apron-like portion 58 in registry with said opening and serving to butt against the free end edge of the front wall 16 and to form a continuation thereof when the cover is in closed position.

Rigidly secured to the bottom 10 between the side wall 14 and the partition wall 42 is a cylindrical boss 60 and this providing a hub adapted to rotatably receive a fishing line spool indicated generally by the reference character 62. The front wall flange 26 is provided with an aperture 64 such that fish line 66 issuing from the spool may be passed through the aperture for convenient dispensing thereof.

A V-shaped anchor strap or strip 68 has its opposite diverging ends secured, respectively in the front and rear corners adjacent the side wall 14, the central apical portion projecting therefrom inwardly toward the boss 60 so as to provide an anchor for the hook ends of snells 70. The complemental partition wall 42 is provided with a plurality of ear members 72 for receiving and anchoring the snell eyes to maintain them in taut relation within the box. Different lengths of snells can thus be accommodated by virtue of the fact that the anchor strip 68 is of V-shaped configuration, that is, is spaced at varying distances from the teeth or ears 72.

Flies 74 may be carried within the tackle box by engaging their hooks into a soft pad of material, such as felt or the like, 76 secured to the top plate 44 and it is to be noted that the interior of the box is lined with soft material such as felt 78 whereby individual hooks 80 may be safely carried therein and it is also to be noted that it is desired that the exterior of the fishing tackle box be covered with a layer of soft material 82.

For the purpose of securing the tackle box on a creel 84 or the like, two of the corners of the box are provided with U-shaped brackets 86 which receive the looped ends of elastic strap members 88 and 90 provided at their outer ends with strap hook members 92 and 94 respectively to engage over the cover 96 of the creel adjacent the fish receiving opening 98 thereof to maintain the fishing tackle box in place. Additionally, a further elastic strap 100 is secured in a similar manner to the opposite end wall of the tackle box and its hook 102 is engaged over one end of the creel in the manner shown.

The boss 60, as shown, is hollow and may be provided if desired with a removable cover 61 such that it presents a receptacle for carrying sinkers, weights and the like. It will also be understood that the tackle box may be constructed of plastic material so as to render it rustproof as well as light in weight and economical to manufacture.

Since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A portable container for fishing tackle comprising a box having a bottom wall marginal front, rear, and interconnecting side walls, a hingedly mounted top wall providing a cover for said box, a V-shaped member fixedly mounted in said box and bridging the space between said front and rear walls, said V-shaped member forming a partition which, with said rear and bottom wall, forms a triangular compartment, the divergent portions of said V-shaped member providing selectively usable anchor surfaces for fishhooks carried by conventional type varilength shells, and a partition also fixedly mounted in said box and bridging the space between the front and rear walls, said partition being spaced from said V-shaped member, the upper portion of said partition having spaced teeth providing selectively usable hold-down anchors for the usual loop-equipped ends of the stated snells, whereby a plurality of snells varying in length may be removably placed in the space of said box by the facilities afforded by said V-shaped member and toothed partition.

2. The structure defined in claim 1, and wherein said V-shaped member is a V-shaped strip rising vertically from said bottom wall, having its median vertex portion centered between the front and rear walls, and spaced from the adjacent side wall and its respective diverging end portions secured in the respective adjacent corners existing between the end portions of said side wall and cooperating respective end portions of said front and rear walls.

3. The structure defined in claim 2 and wherein the interior and exterior surfaces of said walls and surfaces of said V-shaped member are covered with soft felt which assists in anchoring the fishhooks on said snells and also serves to permit extra fishhooks and fishing flies to be attached thereto for carrying and accessibility.

References Cited in the file of this patent
UNITED STATES PATENTS

| | | |
|---|---|---|
| 324,443 | Wilson | Aug. 18, 1885 |
| 365,245 | Graff | June 21, 1877 |
| 369,590 | Claypool | Sept. 6, 1887 |
| 513,044 | Handlan | Jan. 16, 1894 |
| 639,454 | Smith | Dec. 19, 1899 |
| 952,314 | Ellsworth | Mar. 15, 1910 |
| 1,669,928 | Case | May 15, 1928 |
| 1,791,346 | Burch et al. | Feb. 3, 1931 |
| 1,820,648 | Brucker | Aug. 25, 1931 |
| 1,908,278 | Angell | May 9, 1933 |
| 1,910,484 | Thompson | May 23, 1933 |
| 2,395,174 | Drueke | Feb. 19, 1946 |
| 2,530,292 | Crook | Nov. 14, 1950 |
| 2,629,644 | Heys | Feb. 24, 1953 |
| 2,629,964 | Thunell | Mar. 3, 1953 |